United States Patent [19]

Taylor

[11] Patent Number: 4,981,331
[45] Date of Patent: Jan. 1, 1991

[54] LOW REFLECTION OPTICAL RETICLE AND METHOD OF MAKING SAME

[75] Inventor: William H. Taylor, South Deerfield, Mass.

[73] Assignee: Kollmorgen Corporation, Simsbury, Conn.

[21] Appl. No.: 242,722

[22] Filed: Sep. 9, 1988

Related U.S. Application Data

[63] Continuation-in-part of Ser. No. 106,183, Oct. 8, 1987, abandoned.

[51] Int. Cl.$^5$ ................................................. G01C 9/12
[52] U.S. Cl. ...................................... 350/1.1; 356/250; 350/321
[58] Field of Search ................... 33/297, 298; 350/1.1, 350/1.6, 276 R, 321, 562, 565, 566; 356/250, 251, 252

[56] References Cited

U.S. PATENT DOCUMENTS

| | | | |
|---|---|---|---|
| 3,866,711 | 2/1975 | Folds | 350/482 |
| 4,178,404 | 11/1979 | Allen . | |
| 4,194,827 | 3/1980 | Bleeker et al. . | |
| 4,390,276 | 6/1983 | Gudder et al. | 356/251 |
| 4,426,130 | 1/1984 | Knop . | |
| 4,538,913 | 9/1985 | Anthon | 356/371 |
| 4,589,744 | 5/1986 | Uimura et al. | 33/298 |
| 4,669,467 | 6/1987 | Willett et al. . | |
| 4,891,663 | 1/1990 | Hirose | 350/1.3 |

FOREIGN PATENT DOCUMENTS 3412958 10/1985 Fed. Rep. of Germany .
2139378 5/1984 United Kingdom .

OTHER PUBLICATIONS

SPIE, vol. 116, Solid State Imaging Devices (1977), p. 34.
Dictionary of Technical Terms for Aerospace Use, p. 228 (1st Ed., 1965).
"Optical-Contact Bonding Strength of Glass Components", S. S. Kachkin and Yu V. Lisitsyn, Sov. J. of Opt. Technology, pp. 159-161, Mar. 1980.

Primary Examiner—Bruce Y. Arnold
Assistant Examiner—J. P. Ryan
Attorney, Agent, or Firm—Morgan & Finnegan

[57] ABSTRACT

An improved optical reticle having a high degree of reflection suppression is provided. In accordance with the preferred embodiment of the invention a fused silica reticle substrate is optically contacted with a fused silica cover plate to yield a sandwich optical reticle having virtually zero reflectance.

24 Claims, 2 Drawing Sheets

LOW REFLECTION OPTICAL RETICLE AND METHOD OF MAKING SAME

RELATED APPLICATIONS

This application is a continuation-in-part of application Ser. No. 07/106,183 filed Oct. 8, 1987 now abandoned.

TECHNICAL FIELD

The present invention relates to optical reticles and, more particularly, to an improved optical reticle having substantially reduced retro-reflection characteristics.

BACKGROUND AND OBJECTS OF THE INVENTION

Optical sighting and observation devices used in military applications, such as a tank gun sight, frequently possess "cat's eye" reflection or "retro-reflection" characteristics. That is, light incident on the device is reflected from one or more lens, mirror, prism or other optical surfaces and redirected out of the device in exactly the direction from which it came. Thus, particularly in a night environment, the sighting device may effectively act as a beacon, transmitting light back to an enemy illuminating the area with light or other illumination. The adverse consequences of revealing the operator's position in this manner are readily apparent. Hence, a formidable objective in designing and constructing military sighting devices is to eliminate retro-reflection characteristics.

Although all optical surfaces within a given optical system may contribute to retro-reflection, some optical elements contribute more prominently to retro-reflection than other optical elements. The optical element addressed herein is the optical reticle. The optical reticle is the cross-hair optical element provided in the focal plane as a sighting reference. The optical reticle usually consists of a plano-plano polished glass element with fine lines or grooves etched therein and filled with a diffusely reflecting solid such as titanium dioxide. When the reticle is illuminated from the side, preferably with an appropriate red illumination when used at night, the solid material stands out and serves as a highly visible reference for the user. Unfortunately, however, the reticle is a large contributor to the retro-reflection and, hence, the optical "signature" of any given optical sighting device. This is due to the fact that light rays collected by the sighting device and incident upon the polished surface of the reticle are redirected back through the optical system toward the source, i.e. the enemy, without any reduction in intensity due to angular dispersion effects. A simplified optical diagram of this effect is shown in FIG. 1.

Several attempts have heretofore been made by the inventor and others to reduce the undesirable retro-reflection characteristics of the optical reticle.

One such attempt, commonly known as the sandwich cemented reticle, involves cementing a glass cover plate to the reticle. Based upon known optical principles:

$$R = \left(\frac{N_m - N_R}{N_m + N_R}\right)^2 \quad (1)$$

where $R$ = reflection, $N_m$ = refractive index of the medium, i.e. glass plate adjacent to the reticle, and $N_R$ = refractive index of the reticle substrate.

By way of example, for a traditional reticle having no cover plate $N_m = 1$ (i.e. the index of refraction of air) and $N_R$ is approximately 1.5 (i.e. the index of refraction of glass). Based upon Equation 1 above, the amount of reflected light is approximately 0.04 or 4 percent reflectance.

For a sandwich cemented reticle the reflectance in accordance with Equation 1 will theoretically approach zero as the indices of refraction $N_m$ and $N_R$ are made equal. However, sandwich cemented reticles actually involve three optical media: the reticle substrate, the adjacent cover plate, and an optical cement between two reticle substrate and cover plate. Thus, the indices of refraction for all three optical media must be identical in order for the reflectance R to approach zero. Otherwise, the sum of the reflections at the cover plate to cement interface and the cement to reticle interface will be appreciable. The solution to this matching problem has proven elusive. Indeed, aging, humidity, temperature, infra-red exposure and numerous other potential problems may affect optical stability and over time and destroy what had been believed to be ideal optical matching conditions. In particular, such effects over time can alter the properties, including index of refraction, of optical cements. Furthermore, it is difficult to obtain appropriate optical quality glass and cements having identical indices of refraction. Some optical cements are specially prepared to match reticle substrate and cover plate refractive indices, but such cements do not provide sufficient refractive index control to yield the desired degree of reflection suppression.

Thus, attempted solutions simply do not provide sufficient, reliable reflection suppression. Moreover, even when occasional satisfactory results have been obtained, such results have not proven to be repeatable on a regular basis. Therefore, occasionally successful test results have not necessarily indicated a basis for a marketable production item having the desired reflection suppression characteristics. Such occasionally successful results certainly cannot form the basis for a repeatable production item to satisfy traditionally strict military specifications.

Other solutions have been attempted, such as projected reticles which are viewed indirectly rather than etched and filled reticles which are viewed directly. However, these other solutions suffer from other drawbacks, such as not being viewable against bright backgrounds, and are outside the scope of the present invention.

Therefore, it is one object of the present invention to provide an optical reticle having a high degree of reflection suppression.

It is a further object of the present invention to provide an optical reticle having a high degree of reflection suppression which can be produced repeatably.

It is a further object of the present invention to provide an optical reticle of the etched and filled type having a high degree of reflection suppression.

These and other highly desirable and unusual results are accomplished by the present invention in a compact structure which can achieve a high degree of reflection suppression on a repeatable basis.

Objects and advantages of the invention are set forth in part herein and in part will be obvious herefrom, or may be learned by practice with the invention, the same being realized and attained by means of the instrumentalities and combinations pointed out in the appended claims.

SUMMARY OF THE INVENTION

In accordance with the present invention a new type of sandwich reticle is provided wherein the cover plate and reticle substrate are in "optical contact" and, therefore, do not require an additional layer of optical cement therebetween.

Optical contact is a heretofore known phenomenon which causes two well polished flat surfaces to adhere to one another with great force. Polished flat surfaces in optical contact are adhered with such force that they are unified without any other mechanical force and will not come apart when exposed to substantial vibration, shock or temperature variation. In fact, polished flat surfaces in optical contact can only be separated by special techniques, such as by exposing each optical element to extremely different temperatures to cause widely varied thermal expansion. As used herein, the term optical glass should be understood and construed to include any optical medium other than air that is transparent to electromagnetic radiation within the ultraviolet to infra-red spectrum. By way of example only and not by way of limitation, this would include infra-red optical elements made, for example, of germanium or chemically vapor deposited zinc selenide.

Thus, a well polished flat optical cover glass may be optically contacted to a well polished and flat reticle substrate. Since the cover glass and reticle materials can be selected with relative ease from the melt of glass having identical refractive indices to within $\pm 0.000001$, it would theoretically appear that the reticle retro-reflection problem would be completely solved. Improved reflection suppression can be attained in this manner, but with the current state of the art in the techniques of optical contact the ideal "zero reflectance" is not always achieved and, in fact, disappointingly high residual reflectance values may result.

In accordance with the preferred embodiment of the present invention, it has been found that a very high degree of reflection suppression is obtained in an optically contacted reticle when the cover plate and reticle substrate are made from fused silica. Surprisingly, the fused silica optically contacted reticle reduces reflected light to substantially zero, i.e. less than one part per million. Advantageously, this degree of reflection suppression is repeatable and is believed to be capable of forming the basis for a production reticle having the desired degree of reflection suppression.

Thus, the fused silica optically contacted reticle in accordance with the preferred embodiment of the present invention remarkably provides a reticle having substantially zero reflectance. Unlike prior attempted solutions, including the results presently attainable with optically contacted optical glass, the remarkable results obtained with the fused silica optically contacted reticle in accordance with the present invention are repeatable in a production item which will satisfy military specification environmental requirements, e.g. as to humidity.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate principles and preferred embodiments of the present invention, and together with the description serve to explain the principles of the invention, in which.

DETAILED DESCRIPTION OF THE PREFERRED EMBODIMENTS

Figure 1:
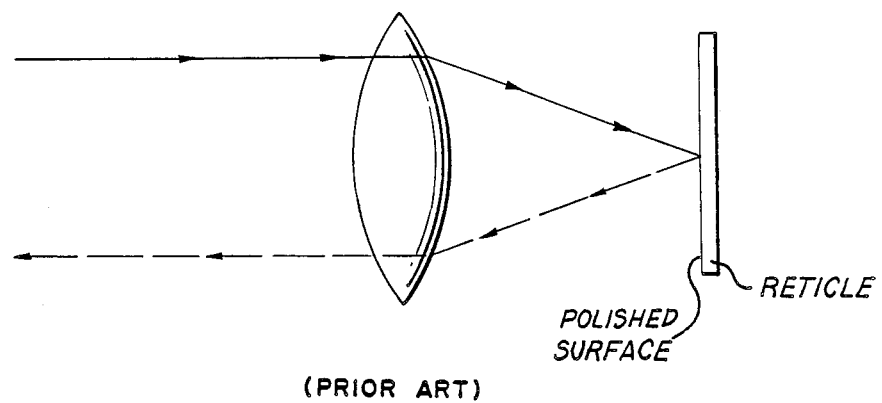
FIG. 1 is an illustration of the retro-reflection which occurs with a standard polished reticle disposed at the focal plane of an imaging lens system.
Figure 2:
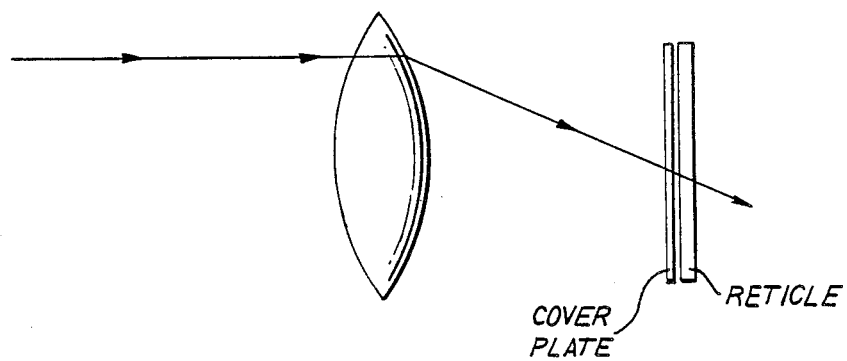
FIG. 2 is an illustration of a sandwiched reticle disposed at the focal plane of an imaging lens system.
Figure 3:
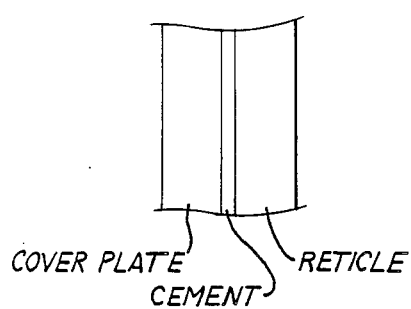
FIG. 3 is an enlarged sectional view of the sandwiched reticle shown in FIG. 2, illustrating the positional relationship of the cover plate, cement and reticle.
Figure 4:
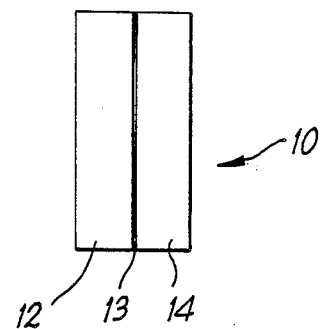
FIG. 4 is a sectional view of an optically contacted reticle in accordance with the invention.

Referring now to FIG. 4, there is shown an optically contacted reticle 10 in accordance with the invention having a cover plate 12 and reticle substrate 14. Cover plate 12 is optically contacted at interface 13 with reticle substrate 14 in a known manner, such as by first contacting the two well polished surfaces at one edge thereof and then gradually bringing the two surfaces into full contact, thereby driving all air from between the surfaces.

Although satisfactory reflection suppression may be attainable when cover plate 12 and reticle substrate 14 are made from optical glass, it is preferred that cover plate 12 and reticle substrate 14 be made of fused silica. It has been found that the fused silica optically contacted reticle in accordance with the preferred embodiment of the present invention obtains results far superior to other attempted solutions using presently available techniques. Significantly, it has been found that the fused silica optically contacted reticle obtains repeatable near zero reflection in a structure which will satisfy stringent military specifications. This result has heretofore proved unattainable. Although the underlying physics which could explain the remarkable performance of fused silica is not fully understood, it is believed that the low reflectance bond is due to the molecular binding forces among the molecules of the material and that there are basically two prerequisites for low reflectance optical contacting.

First, the surfaces must be smooth, clean and flat so as to permit the maximum glass-to-glass area contact, that is, to minimize the number of intervening molecules of other substances such as nitrogen, oxygen, and carbon dioxide from the air, oil films, oxides formed between constituents of the glass and the air, etc. Smoothness is a function of the polishing process and can be achieved through the use of conventional optical polishing media and processes and through ion beam etching techniques. The ideal condition is therefore one in which the surfaces to be bonded are perfectly planar, free of all scratches and digs and free of foreign matter of every kind.

Secondly, in order for the electromagnetic radiation to propagate across the boundary of the two pieces of glass without interruption or disturbance the arrangement and structure of the molecules on both sides of the interface must be as near as possible to that which the radiation sees as it passes through the bulk material. When this condition is satisfied the wave propagates entirely forward with no component of the wave being reflected back, as it always is at the interface of two different dielectric media. Traditionally, even if two surfaces are perfectly smooth, clean and flat some reflectance is expected at the interface of the two contacting surfaces. It is believed that this reflectance is due to a difference between the mating of the molecules across the interface and the mating arrangement of the molecules within the bulk material itself. Within the bulk material, the mating arrangement of the molecules is established during the annealing process through the action of molecular forces. For many optical glasses the mating arrangement within the bulk material would not be the same from one plane to the next, making it difficult, if not impossible, to reconstruct the same molecular arrangement between the flat surfaces at the interface. However, if the molecular structure of the optical glass is simple with regard to the number and arrangement of the molecules and virtually identical in structure from one plane to the next within the material, as is believed to be the case with fused silica, then two samples optically contacted at flat surfaces will obtain a low reflectance bond in accordance with the present invention.

Figure 5:
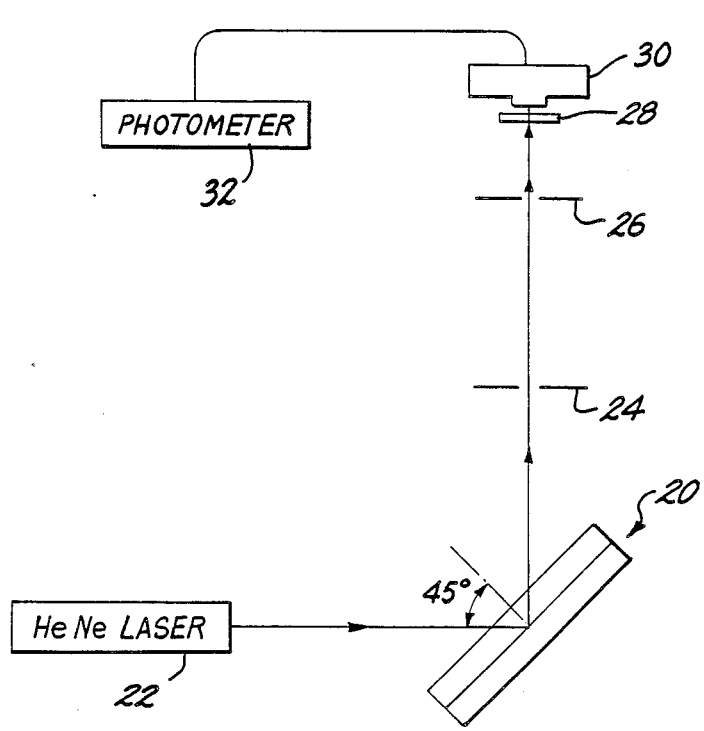
FIG. 5 is a diagram of a laboratory apparatus used to measure the reflection characteristics of test reticles.

The advantages of the present invention will be appreciated from the following examples. All of the empirical reflection data set out in the examples ere obtained using the laboratory set up shown in FIG. 5 for measurement of reticle reflectance. As there shown, the reticle 20 under test was mounted in the laboratory set up so that the test illumination from a helium neon laser source 22 was incident upon the reticle at a 45° angle to normal. For optical contact and sandwich cemented reticle samples light from the reticle under test was passed through two iris diaphrams 24, 26 to eliminate reflections from the top and bottom surfaces, i.e. the air interfaces, from reaching the detector. For optical contact and cemented reticles no spatial distinction could be observed in reflections from either side of the cover plate to reticle interface layer. Light reflected from the test reticle was passed through an appropriate helium neon spike filter 28 and detected by detector 30 of photometer 32. Normalization readings were taken by placing filter 28 and detector 30 directly in the optical path of the laser beam before the test reticle to obtain a 100% source reading. It should be noted that the present experiment was concerned only with measuring reflection from the polished reticle surface at the cover plate to reticle interface and not reflections from the top or bottom surfaces. This is due to the fact that the largest contribution to reticle retro-reflection comes from the polished rear surface of the reticle, which surface is not subject to angular dispersion effects. The top and bottom air to glass reticle interfaces, on the other hand, are subject to considerable reflection suppression from angular dispersion and intentional increases in the thickness of the cover plate and reticle substrate optical elements.

As a check on the degree of refractive index matching achieved in each of the following examples the effective difference in index of refraction $\Delta N$ was calculated for sandwich reticles from the following equation.

$$\Delta N = \sqrt{2N^2 R} \tag{2}$$

where
R = measured reflectivity, and
N = refractive index of the reticle substrate.

EXAMPLE 1

A standard plano-plano polished glass reticle was prepared from a sample of K5[1] glass having an index of refraction N=1.52249. No cover glass or antireflection coating was applied. Using the laboratory apparatus shown in FIG. 5 the reflection from the air-glass interface was measured as 0.0435 or 4.35%. Since Equation (2) follows only for sandwich reticles, Equation (1) was used to determine $\Delta N$ for the standard reticle of this Example. Using the measured reflectance R=0.0435 and the published refractive index for K5 glass $N_R$=1.52249, Equation (1) was solved for $N_m$, the actual value of which is known to be 1.0, i.e. the index of refraction for air. The difference $\Delta N$ between the known and calculated values of $N_m$ was calculated to be 0.526.

Unless otherwise specified, all glass materials were selected from the Schott glass catalog.

EXAMPLE 2

A sandwich cemented reticle was prepared from two samples of K5 glass cemented together with U.V. 74 military specification optical cement (N=1.55 at 25° C.). The measured reflection was 0.000960 or 0.0960% and $\Delta N$ was calculated from Equation (2) to be 0.067.

EXAMPLE 3

A sandwich cemented reticle having improved index matching was prepared from two pieces of barium glass BaK5 (N=1.55671) cemented with U.V. 74 military specification cement. The measured reflection was 0.000090 or 0.009% and $\Delta N$ was calculated from Equation (2) to be 0.021.

A second sample was prepared in the same manner. The reflectance was measured as 0.000024 or 0.0024% and $\Delta N$ was calculated to be 0.0108. The reasons for the improved measured reflectance over the first sample are not known.

EXAMPLE 4

A sandwich cemented reticle was prepared using two pieces of BaK5 glass cemented with a known dual compound optical cement available from Sanders Co. of Nashua, N.H. Reflectance was measured as 0.0000094 or 0.00094% and $\Delta N$ was calculated from Equation (2) to be 0.0068. However, the dual compound optical cement used in the preparation of this sample could not satisfy military specification requirements on humidity.

A second sandwiched reticle sample was prepared using an improved dual compound cement which would satisfy military specification humidity requirements. The measured reflectance was 0.000022 or 0.0022% and $\Delta N$ was calculated to be 0.0103. Thus, although the humidity problem was solved, increases in both reflectance and $\Delta N$ were observed. In addition, the viscosity of the improved cement was less satisfactory.

EXAMPLE 5

An optically contacted sandwiched reticle was prepared from two pieces of C-1 crown optical glass (N=1.523). C-1 crown glass is domestically available from such sources as Corning Glass Works of Corning, N.Y. The measured reflectance was 0.000510 or 0.0510% and $\Delta N$ was calculated from Equation (2) to be 0.0486.

EXAMPLE 6

An optically contacted sandwich reticle was prepared from two pieces of SF-8 glass (N=1.684). Reflectance was measured as 0.002020 or 0.202% and $\Delta N$ was calculated from Equation (2) as 0.1070. Thus, the optically contacted SF-8 glass reticle resulted in an unacceptable measured reflectance four times greater than the optically contacted C-1 glass reticle.

EXAMPLE 7

A sandwich reticle was prepared by optically contacting two pieces of fused silica available from Corning Glass under the designation 7940 (N=1.458). Remarkably, the measured reflectance was measured to be 0.0000008 or 0.00008% and $\Delta N$ was calculated from Equation (2) as 0.0018.

The results of the foregoing examples are summarized in Table 1.

TABLE 1

| Reticle Design | Reticle Surface Measured Reflectivity (%) | Effective $\Delta N$ |
|---|---|---|
| 1. Uncompensated Standard Reticle (Example 1) | 4.3500 | .526 |
| 2. Sandwich Cemented Reticle (Example 2) | .0960 | .067 |
| 3. Sandwich Cemented Improved Index Match (Example 3, first sample) | .0090 | .021 |
| 4. Sandwich Cemented Improved Index Match (Example 3, second sample) | .0024 | .018 |
| 5. Sandwich Cemented Dual Compound Cement (Example 4, first sample) | .00094 | .0068 |
| 6. Sandwich Cemented Improved dual Compound Cement (Example 4, second sample) | .0022 | .0103 |
| 7. Sandwich Optically Contacted C-1 glass (Example 5) | .0510 | .0486 |
| 8. Sandwich Optically Contacted SF-8 glass (Example 6) | .2020 | .1070 |
| 9. Sandwich Optically Contacted Fused Silica Plates | .00008 | .0018 |

The foregoing results indicate that a remarkable improvement in reflection suppression was obtained with optically contacted fused silica. Reflection suppression with optically contacted fused silica was at least ten times greater than with cemented reticles and over twenty seven times greater than obtained with cemented reticles which could meet military specification environmental requirements. In fact, optically contacted fused silica approaches the ideal zero reflectance.

Although this ideal result should, in theory, be attainable with optically contacted optical glass, the current state of the art apparently does not obtain such results. Thus, although optically contacted optical glass reticles may obtain favorable results, the optically contacted samples of Examples 5 and 6 showed reflectances from over 500 to 2,000 times greater than obtained with the preferred optically contacted fused silica reticle of Example 7. Thus, although future advances in optical glass and in the art of optical contact may achieve reflection suppression approaching zero reflectance, it is presently preferred to use optically contacted fused silica. It should be noted, however, that optically contacted optical glass reticles in accordance with the invention remarkably permit the elimination of cement used with sandwich cemented reticles. This alone is a significant achievement since eliminating the cement reduces the number of optical media that must be matched and eliminates undesirable changes in optical properties of cement over time due to temperature, humidity, radiation, etc. Thus, the optically contacted optical glass reticle in accordance with the present invention constitutes a remarkable improvement over sandwich cemented reticles.

It should be further emphasized that the remarkable results obtained by optically contacted fused silica are not restricted to surprisingly low reflection values. It has been found that the preferred optically contacted fused silica reticle, unlike sandwich cemented or presently attainable optically contacted optical glass reticles, consistently and repeatably attains an amazingly high degree of reflection suppression. In addition, the optically contacted fused silica reticle should satisfy military specification environmental requirements. Indeed, since no optical cement is used no consideration need be given to the countervailing consideration inherent with such cements, e.g. index matching, stability, etc.

Thus, the optically contacted fused silica reticle in accordance with the present invention appears capable of forming the basis for a production item with a repeatable high degree of reflection suppression. Heretofore known reticle structures prepared with presently available optical assembly techniques simply cannot approach either the high degree or repeatability of reflection suppression obtained with preferred optically contacted fused silica reticle in accordance with the present invention.

To the extent not already indicated, it will be understood that improvements in optical glass materials and in the state of presently available optical contact techniques may make it possible to achieve, on a reliable basis, optically contacted optical glass reticles having a high degree of reflection suppression, all within the scope of the present invention. Notwithstanding the emphasis herein upon the signifcance of the present invention for military sighting devices, it will be appreciated that the advantages of the present invention may find use in non-military applications.

The invention in its broader aspects therefore is not limited to the specific embodiments herein shown and described but departures may be made therefrom within the scope of the accompanying claims, without departing from the principles of the invention and without sacrificing its chief advantages.

What is claimed is:

1. An optical reticle comprised of an optical glass reticle substrate optically contacted with an optical glass cover plate.

2. The optical reticle according to claim 1 wherein said optical glass has a relatively simple molecular structure with regard to the number and arrangement of molecules, said molecular structure being virtually identical in structure from one plane to the next within the optical glass material.

3. The optical reticle according to claim 2 wherein said optical glass is fused silica.

4. An optical reticle comprising an optical glass reticle substrate optically contacted with an optical glass cover plate, said optical glass being germanium.

5. An optical reticle comprising an optical glass reticle substrate optically contacted with an optical glass cover plate said optically contacted reticle substrate and cover plate having a reflectivity no greater than about one part per million.

6. An optical reticle comprising an optical glass reticle substrate in optical contact with an optical glass reticle cover plate, said optical glass being zinc selenide.

7. An optical reticle comprised of a fused silica reticle substrate and a fused silica cover plate which are disposed in optical contact.

8. The optical reticle according to claim 7 wherein said fused silica reticle substrate and said fused silica reticle cover plate are disposed in optical contact, said optically contacted fused silica reticle substrate and cover plate having a reflectance less than about one part per million.

9. The optical reticle according to claim 7 wherein said fused silica reticle substrate and fused silica reticle cover plate are disposed in optical contact, said optically contacted fused silica reticle substrate and cover plate having a reflectivity of about 0.00008%.

10. The optical reticle according to claim 7 wherein said fused silica reticle substrate and said fused silica reticle cover plate are disposed in optical contact, said optically contacted fused silica reticle substrate and cover plate having an effective difference in index of refraction of about 0.0018.

11. A method of making an optical reticle comprising the steps of:
    (i) selecting a reticle substrate;
    (ii) selecting a cover plate;
    (iii) ensuring that a first surface of each of said reticle substrate and reticle cover plate are smooth, clean and flat;
    (iv) optically contacting said reticle substrate and said cover plate at the respective first surfaces thereof to provide an optical reticle.

12. The method according to claim 11 wherein said reticle substrate and said cover plate are made from optical glass.

13. The optical reticle according to claim 12 wherein said optical glass is germanium.

14. The optical reticle according to claim 12 wherein said optical glass is zinc selenide.

15. The method according to claim 12 wherein said optical glass is fused silica.

16. The method of claim 11 wherein said reticle substrate and said reticle cover plate are made from fused silica, said optically contacted fused silica reticle substrate and cover plate having a reflectance less than about one part per million.

17. The method according to claim 11 wherein said reticle substrate and said reticle cover plate are made from optical glass, said optically contacted optical glass reticle substrate and cover plate having a reflectance less than about one part per million.

18. A method of making an optical reticle comprising the steps of:
    (i) providing a fused silica reticle substrate;
    (ii) providing a fused silica reticle cover plate;
    (iii) optically contacting said fused silica reticle substrate and said fused silica cover plate, said optically contacted fused silica reticle substrate and cover plate having a reflectivity of about 0.00008%.

19. The method according to claim 18 wherein said optically contacted fused silica reticle substrate and said cover plate are optically contacted so as to have an effective difference in index of refraction of about 0.0018.

20. A method of making an optical reticle comprising the steps of:
    (i) selecting an optical glass having a relatively simple molecular structure with regard to the number and arrangement of molecules, said molecular structure being virtually identical in structure from one plane to the next within the optical glass material;
    (ii) preparing a reticle substrate from said optical glass having a substantially flat, smooth and clean reticle surface;
    (iii) preparing a reticle cover plate from said optical glass having a substantially flat, smooth and clean reticle cover plate surface;
    (iv) optically contacting said reticle substrate surface and said cover plate surface so as to bond said reticle substrate to said cover plate, thereby obtaining an optical reticle having reflectance less than about one part per million.

21. The method according to claim 20 wherein said step of selecting an optical glass comprises selecting fused silica.

22. The method according to claim 20 wherein said step of selecting an optical glass comprises selecting fused silica, said optically contacted fused silica optical reticle having a reflectivity of about 0.00008%.

23. The method according to claim 20 wherein said step of selecting an optical glass comprises selecting germanium.

24. The method according to claim 20 wherein said step of selecting an optical glass comprises selecting zinc selenide.

* * * * *